United States Patent
Giraud

(10) Patent No.: US 9,541,365 B2
(45) Date of Patent: Jan. 10, 2017

(54) COMPACT CASE TRIMMER

(71) Applicant: Douglas Hilton Giraud, Richmond, TX (US)

(72) Inventor: Douglas Hilton Giraud, Richmond, TX (US)

( * ) Notice: Subject to any disclaimer, the term of this patent is extended or adjusted under 35 U.S.C. 154(b) by 0 days.

(21) Appl. No.: 14/684,982

(22) Filed: Apr. 13, 2015

(65) Prior Publication Data

US 2016/0018203 A1 Jan. 21, 2016

Related U.S. Application Data

(60) Provisional application No. 62/025,831, filed on Jul. 17, 2014.

(51) Int. Cl.
| | |
|---|---|
| *F42B 33/00* | (2006.01) |
| *F42B 33/10* | (2006.01) |
| *F42B 35/02* | (2006.01) |
| *B23B 51/10* | (2006.01) |
| *B23B 5/16* | (2006.01) |

(52) U.S. Cl.
CPC ............. *F42B 33/10* (2013.01); *F42B 33/004* (2013.01); *F42B 35/02* (2013.01); *B23B 5/167* (2013.01); *B23B 51/103* (2013.01); *Y10T 408/98* (2015.01)

(58) Field of Classification Search
CPC ......... F42B 33/10; F42B 33/004; F42B 35/02; Y10T 408/98; B23B 51/03; B23B 5/167
USPC ............................................................. 86/24
See application file for complete search history.

(56) References Cited

U.S. PATENT DOCUMENTS

| | | |
|---|---|---|
| 2,032,384 A | 3/1936 | West |
| 2,211,183 A | 8/1940 | Tytus |
| 2,353,295 A | 7/1944 | Day |
| 2,881,644 A | 4/1959 | Conner |
| 3,174,390 A * | 3/1965 | Jacobsen ................ F42B 35/02 86/19.7 |
| 3,175,456 A | 3/1965 | Goodsell |

(Continued)

FOREIGN PATENT DOCUMENTS

| | | |
|---|---|---|
| DE | 202011003860 U1 | 5/2011 |
| FR | 2310826 A1 | 12/1976 |
| WO | 9117852 A1 | 11/1991 |

OTHER PUBLICATIONS

Non-Final Office Action dated Oct. 30, 2015 in U.S. Appl. No. 14/805,282; 14 Total Pages.

(Continued)

*Primary Examiner* — Michelle R Clement

(74) *Attorney, Agent, or Firm* — Patterson & Sheridan, L.L.P.

(57) ABSTRACT

A method and apparatus for sizing ammunition cartridge cases includes a cartridge case trimmer including a cylindrical housing, a mandrel detachably coupled to a longitudinally-oriented opening formed in a first side of the cylindrical housing, the mandrel having a first end including a cutting tool disposed in a slot on the first end and comprising one or more notched cutting surfaces, the mandrel having a second end opposing the first end, the second end protruding from the first side of the cylindrical housing and sized to be received in a chuck, a bearing disposed within the cylindrical housing adjacent to a second side of the cylindrical housing, and an insert comprising a tapered region disposed in an inside diameter of an inner ring of the bearing.

15 Claims, 8 Drawing Sheets

(56) References Cited

U.S. PATENT DOCUMENTS

| | | | |
|---|---|---|---|
| 3,283,643 A | | 11/1966 | Mittlestedt |
| 3,304,597 A | | 2/1967 | Kezran |
| 3,324,529 A | | 6/1967 | McCreery |
| 3,335,526 A | | 8/1967 | Weiss |
| 3,361,014 A | | 1/1968 | McClennan |
| 3,645,640 A | | 2/1972 | Zukas |
| 3,717,055 A | | 2/1973 | Pendleton |
| 3,833,313 A | | 9/1974 | Gallion |
| 4,325,282 A | * | 4/1982 | Schaenzer ............... F42B 33/10 86/19.7 |
| 4,665,780 A | | 5/1987 | Plaquin et al. |
| 4,709,604 A | | 12/1987 | Rogers |
| 4,813,827 A | * | 3/1989 | Dugger ................. B23B 5/168 408/211 |
| 5,076,122 A | | 12/1991 | Katzenburger et al. |
| 5,309,813 A | | 5/1994 | Henley |
| 5,433,130 A | | 7/1995 | Smith et al. |
| 5,635,661 A | * | 6/1997 | Tuftee .................... F42B 33/10 86/24 |
| 5,852,962 A | | 12/1998 | Fraering, Jr. |
| 6,101,915 A | | 8/2000 | Sinclair |
| 6,276,244 B1 | | 8/2001 | Fisher et al. |
| 6,397,718 B2 | | 6/2002 | Jamison et al. |
| 6,484,616 B1 | | 11/2002 | Giraud |
| 7,155,789 B1 | * | 1/2007 | Gracey .................. B23B 5/165 29/33 T |
| 8,827,607 B1 | | 9/2014 | Goodman |
| 9,146,087 B2 | * | 9/2015 | Cottrell ................... F42B 33/10 |
| 2003/0113176 A1 | | 6/2003 | Kress |
| 2008/0003069 A1 | | 1/2008 | Harper |
| 2011/0232467 A1 | | 9/2011 | Keska |

OTHER PUBLICATIONS

Final Office Action dated Feb. 10, 2016 in U.S. Appl. No. 14/805,282; 9 Total Pages.

Avery S, "Worlds Finest Trimmer by Little Crow Gunworks . . . A review," Online video clip, https://www.youtube.com/watch?v=yVcwkT6t13s. Oct. 29, 2011.

* cited by examiner

COMPACT CASE TRIMMER

CROSS-REFERENCE TO RELATED APPLICATIONS

This application claims benefit of U.S. Provisional Patent Application Ser. No. 62/025,831, filed Jul. 17, 2014, which is herein incorporated by reference in its entirety.

BACKGROUND

Field

Embodiments of the disclosure generally relate to methods and apparatus for conditioning ammunition cartridge cases. More specifically, embodiments described herein relate to methods and apparatus for sizing ammunition cartridge cases in a reloading operation.

Description of the Related Art

An ammunition cartridge case is typically made from a metallic material, such as steel, aluminum or brass, and includes a mouth that holds a projectile that may be fired from a firearm. Metallic cartridge cases expand as a result of the firing process. If a user desires to reuse (i.e., reload) the cartridge case, the proper cartridge case length and mouth diameter must be restored through a sizing process.

Properly sizing the metallic material includes resizing or swaging the cartridge case using a metallic die. The die is used to reform the cartridge case to proper dimensions, which were distorted by the high pressures generated during a previous firing. When the cartridge case is resized, the diameter of the mouth is reduced slightly so the case may then be reinserted into a chamber of a firearm without interference. However, while the swaging process reduces the diameter of the case along its main axis, the material is displaced axially along the length of the cartridge case. Proper sizing also includes trimming the cartridge case to the proper length for a specific chamber size for a specific caliber, and properly deburring/chamfering the cartridge case. If the case is longer than the maximum case length for the specific chamber, the neck of the case may actually extend at least partially into the throat portion of the chamber. The extension of the case into the throat may cause "pinching" of the bullet or severely increase neck tension. This may result in abnormally high or even dangerous pressures within the firearm when the reloaded ammunition cartridge case is fired.

Commercially available handheld trimming devices typically only reduce the length of the cartridge case using an end mill or other flat-ended cutting device. The trimming operation performed by the conventional devices leaves the end of the cartridge case flat but often produces burrs along the cut surface of the mouth, which requires a subsequent deburring and/or a chamfering process by another tool or tools.

What is needed is a compact cartridge case trimmer that performs a trimming and deburring and/or chamfering operation in a sizing process.

SUMMARY

Embodiments described herein relate to a method and apparatus for sizing elongated, tubular casings made of a metallic material, or other material, that may be used as a cartridge case.

In one embodiment, a cartridge case trimmer is provided. The cartridge case trimmer includes a cylindrical housing, a mandrel detachably coupled to a longitudinally-oriented opening formed in a first side of the housing, the mandrel having a first end including a cutting tool disposed in a slot on the first end and comprising one or more notched cutting surfaces, the mandrel having a second end opposing the first end, the second end protruding from the first side of the housing and sized to be received in a chuck, a bearing disposed within the housing adjacent to a second side of the housing, and an insert comprising a tapered region disposed in an inside diameter of an inner ring of the bearing.

In another embodiment, a cartridge case trimmer includes a cylindrical housing, a mandrel having a first end and a second end opposing the first end, the first end of the mandrel being detachably coupled to a longitudinally-oriented opening formed in a first side of the housing and including a cutting tool that has a cutting edge that is extendable beyond a diameter of the mandrel, the second end protruding from the first side of the housing and sized to be received in a chuck, a bearing disposed within the housing adjacent to a second side of the housing, and a replaceable insert comprising a tapered region disposed in an inside diameter of an inner ring of the bearing.

In another embodiment, a cartridge case trimmer includes a cylindrical housing having a first side and a second side opposing the first side, a mandrel detachably coupled to a longitudinally-oriented opening comprising a threaded region formed in the first side of the housing, the mandrel having a first end including a cutting tool disposed in an indexing slot on the first end and comprising one or more notched cutting surfaces, the mandrel having a second end opposing the first end, the second end protruding from the first side of the housing and sized to be received in a chuck, a channel formed across a portion of the threaded region of the opening, a bearing disposed within the housing adjacent to a second side of the housing, and an insert disposed in an inside diameter of an inner ring of the bearing.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments described herein relate to a method and apparatus for preparing elongated, tubular casings made of a metallic material, or other material, that may be used as a cartridge case for a reloading operation. The cartridge case as described herein include cylindrical ammunition cartridges made of steel, aluminum, or brass, but may also include other cartridge cases made of a non-metallic material.

Figure 1:
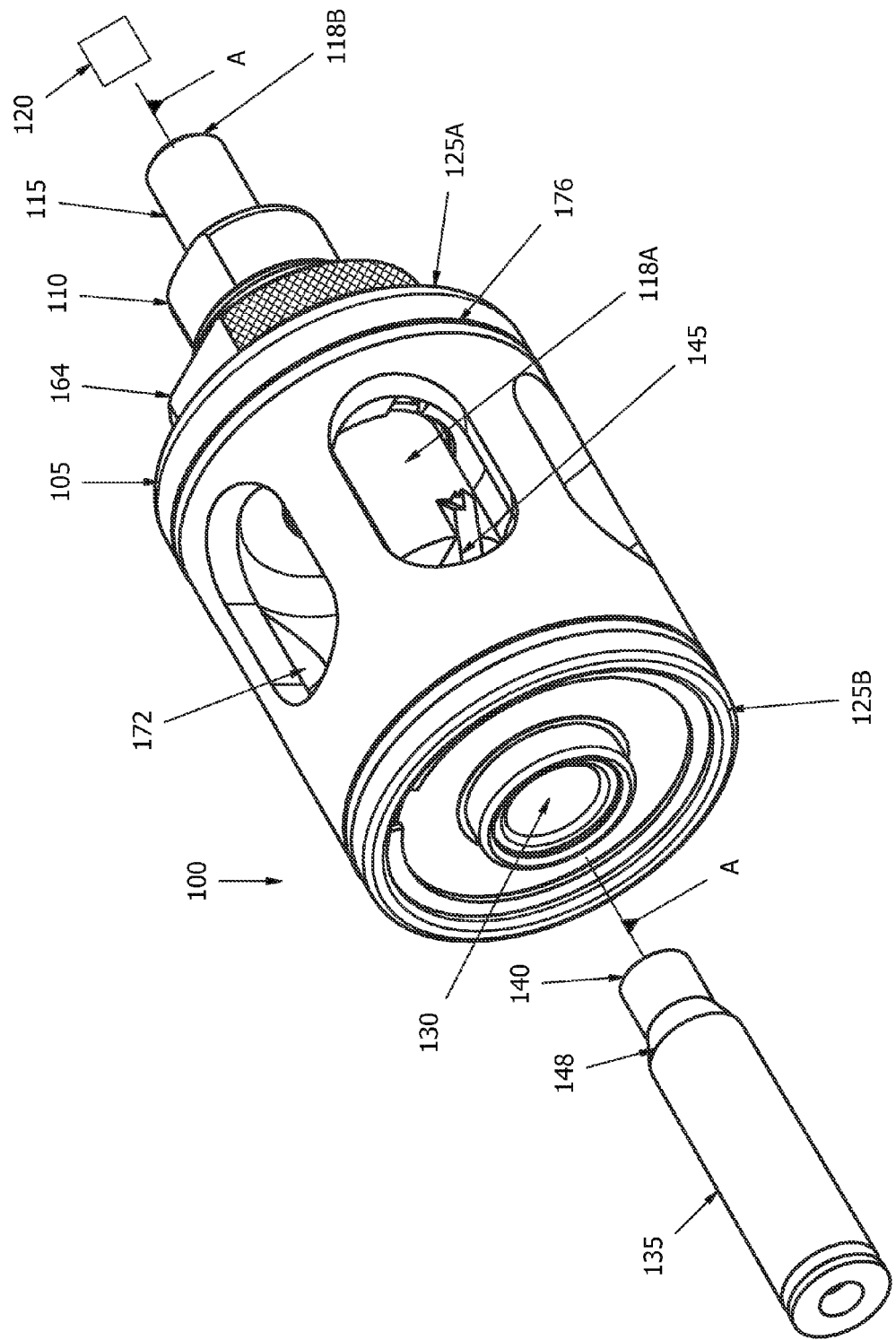
FIG. 1 is an isometric view of one embodiment of a case trimmer.
Figure 2:
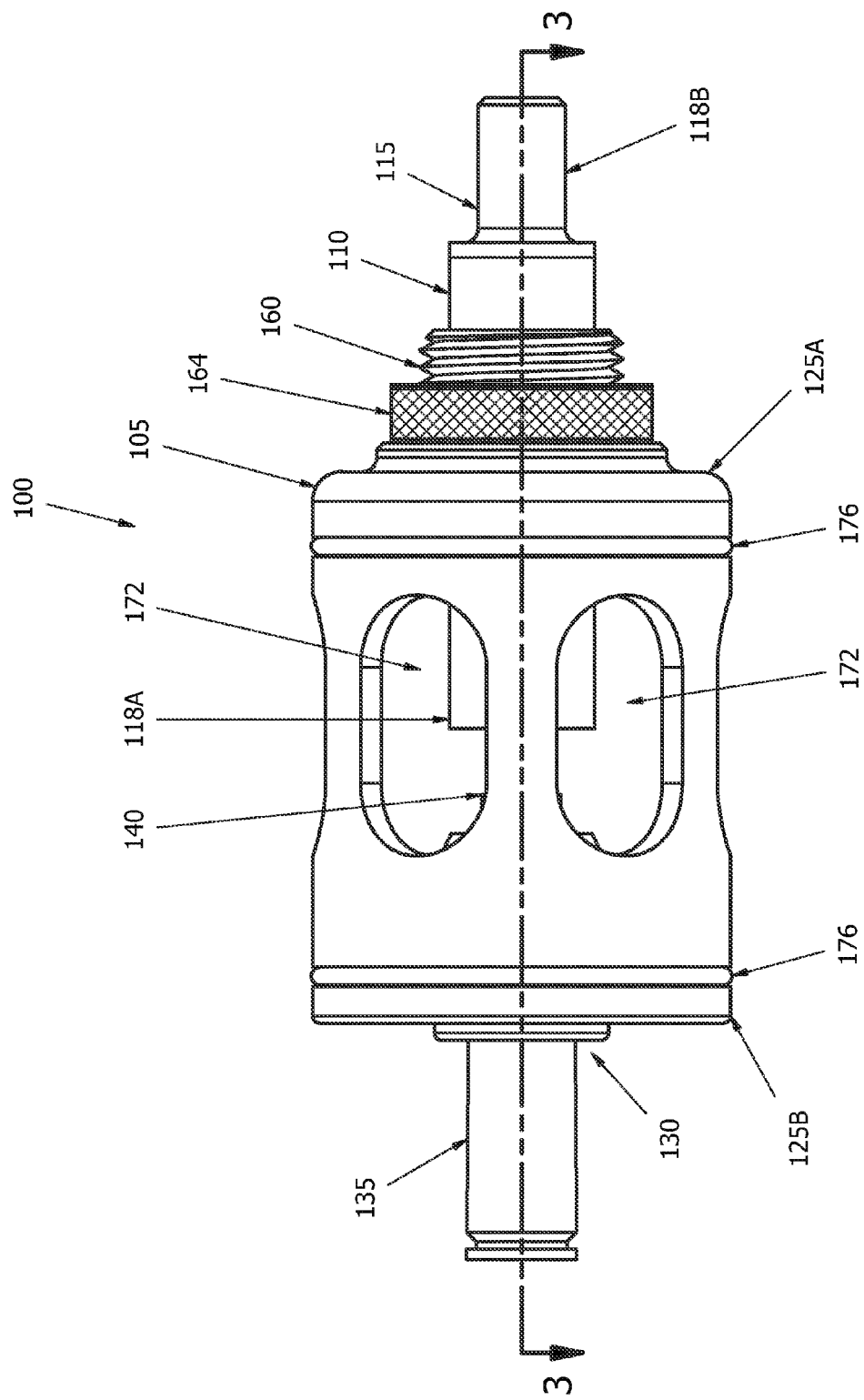
FIG. 2 is a side view of the cartridge case trimmer of FIG. 1.
Figure 3:
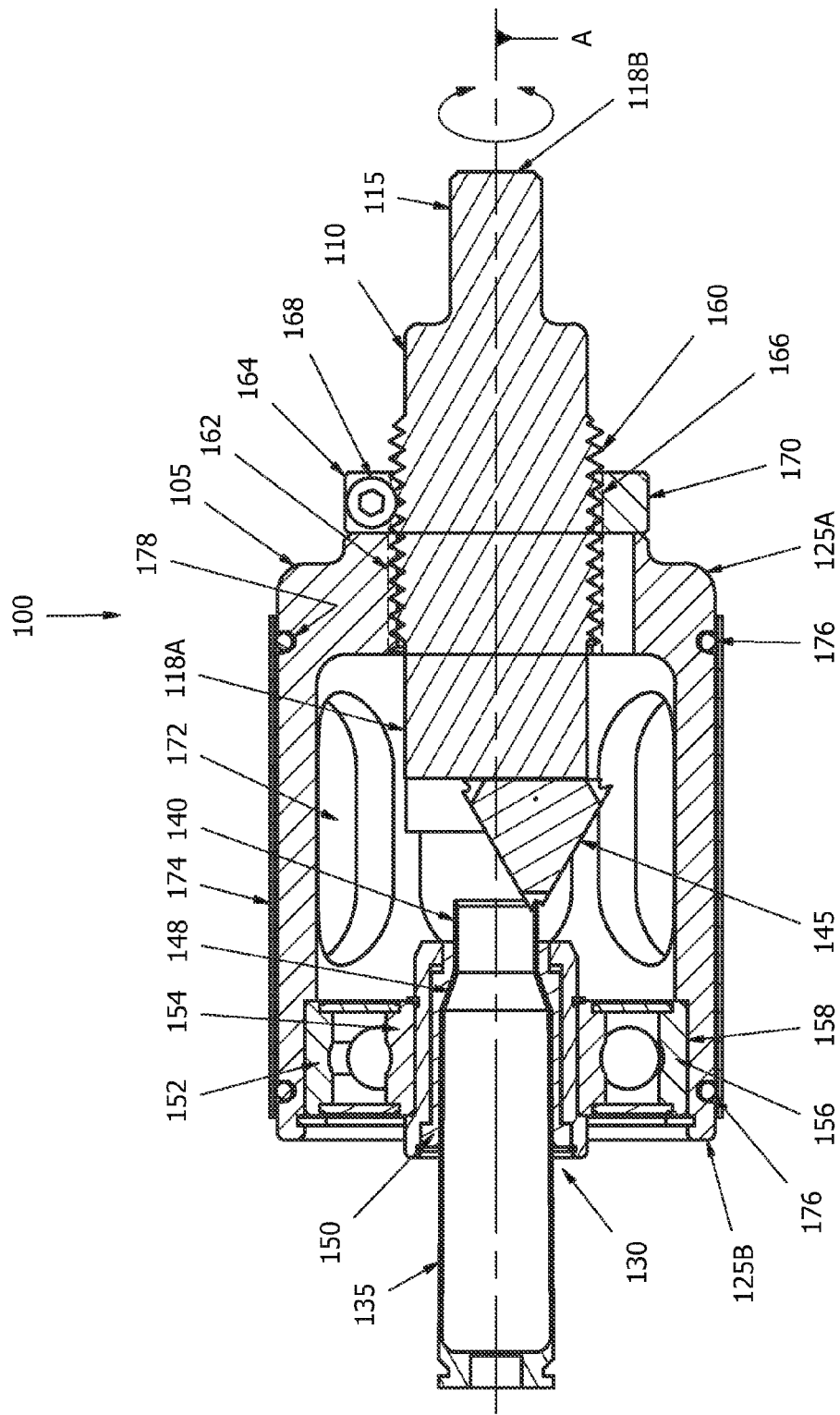
FIG. 3 is a cross-sectional view of the cartridge case trimmer along lines 3-3 of FIG. 2.

An embodiment of a cartridge case trimmer 100 will be described with reference to FIGS. 1-3. FIG. 1 is an isometric view of the cartridge case trimmer 100 and FIG. 2 is a side view of the cartridge case trimmer 100 of FIG. 1. FIG. 3 is a cross-sectional view of the cartridge case trimmer 100 along lines 3-3 of FIG. 2.

The cartridge case trimmer 100 includes a cylindrical housing 105 having a longitudinal axis A disposed through a center thereof. A mandrel 110 is disposed in the housing 105. The mandrel 110 includes a shaft 115 that has a first end 118A and a second end 118B. The second end 118B may be generally sized (i.e., including a length and/or outer dimension) to be received by a chuck 120. The chuck 120 may be a clamping device disposed on a hand drill (manual or powered), a drill press (manual or powered), or other drilling device or rotatable press device. When the shaft 115 of the mandrel 110 is coupled to the chuck 120 and the chuck is rotated, the housing 105 and the mandrel 110 rotate about the longitudinal axis A. The housing 105 includes a first side 125A having the mandrel 110 coupled thereto and a second side 125B opposing the first side 125A. An opening 130 is defined in the second side 125B of the housing 105. A cartridge case 135 may be inserted into and is at least partially received by the opening 130. The opening 130 is dimensioned to limit the length of the cartridge case 135 that is inserted into the housing 105. For example, the opening 130 may index the cartridge case 135 such that a mouth 140 of the cartridge case 135 may be received in the housing 105 and be positioned to interface with a cutting tool 145 coupled to the first end 118A of the mandrel 110. In operation, when the mandrel 110 is rotating about the longitudinal axis A, the cartridge case 135 is generally stationary relative to the rotating mandrel 110 (and the cutting tool 145 coupled thereto). The cartridge case 135 may be held in a user's hand, or otherwise clamped or immobilized to prevent rotation and facilitate cutting by the cutting tool 145.

The opening 130 may be sized such that insertion of the cartridge case 135 is limited by a shoulder 148 of the cartridge case 135. As shown in FIG. 3, an insert 150 may be secured to the housing 105 within the opening 130. The insert 150 may be a replaceable component and is configured to be detachably coupled to the housing 105. For example, the insert 150 may be replaced based on a desired cartridge case size for the trimming operation. The insert 150 may be sized to match an angle of the shoulder 148 as well as the diameter of the mouth 140 of the cartridge case 135. The insert 150 may be dimensioned to receive many different cartridge cases 135. Examples include 0.223 caliber or 5.56 millimeter (mm) cartridges, 0.308 caliber or 7.62 mm cartridges, 30-06 caliber cartridges, as well as numerous other sizes and calibers, such as between various 0.17 calibers up to 0.50 calibers. Additional details of the insert 150 are described in FIG. 5 and FIG. 7.

The cartridge case trimmer 100 also includes a bearing 152 that is disposed within an inside diameter of the housing 105. The bearing 152 includes an inside race or inner ring 154. The insert 150 is sized to be disposed within an inside diameter of the inner ring 154. An outside race or outer ring 156 of the bearing 152 is received in a bearing receiving region 158 formed in the second side 125B of the housing 105. An inside diameter of the bearing receiving region 158 is sized to prevent movement of the outer ring 156 relative to the housing 105 while the inner ring 154 is free to rotate about the longitudinal axis A.

The replacablity of the insert 150 decreases costs for the owner of the cartridge case trimmer 100 as some conventional trimmers require replacement of a bearing (such as the bearing 152) when trimming different cartridge cases. An owner that uses the cartridge case trimmer for multiple, different caliber cartridge cases would thus be forced to purchase multiple bearings for these different calibers. However, according to embodiments described herein, the insert 150, which may be produced and sold much cheaper than a bearing, need only be replaced.

As described above, the insert 150 limits the length of the cartridge case 135 within the housing 105. The insert 150 may function as an indexing feature by limiting length of the cartridge case 135 when inserted therein. The depth of cut provided by the cutting tool 145 may also be adjusted. For example, the mandrel 110 includes threads 160 that interface with threads 162 formed in an opening in the housing 105. The housing 105 and the mandrel 110 may thus be rotatable relative to each other along the longitudinal axis A. When rotated about the axis A with the cutting tool 145 thereon, the length of the mandrel 110 that is inserted into the housing may be adjusted, which adjusts the position of the cutting tool 145. Thus, when the cartridge case 135 is indexed by the insert 150, the mandrel 110 may be adjusted to provide a desired depth of cut by the cutting tool 145 providing a desired amount of material removal from the cartridge case 135. The depth of cut may be known based on historical trimming data. Alternatively, the depth of cut may be determined based on one or more trial cuts of the cartridge case 135.

Once depth of cut is determined, a fastener 164 may be used to prevent rotation of the mandrel 110 about the longitudinal axis A, thus fixing the mandrel 110 relative to the housing 105. The fastener 164 may be a nut that interfaces with the threads 160 on the mandrel 110 that is used as a lock nut when tightened against the first side 125A of the housing 105. In the embodiment shown, the fastener 164 is a locking split ring 170, which includes female threads 166 that mate with the threads 160 of the mandrel 110. The locking split ring 170 also includes a set screw 168 that is utilized to clamp the locking split ring 170 against the mandrel 110, thus locking the female threads 166 of the locking split ring 170 against the threads 160 of the mandrel 110.

The housing 105 includes one or more windows 172 formed along the longitudinal axis A, which allows a user to view the interior of the housing 105. The windows 172 may be used to observe the interaction between the cutting tool 145 and the cartridge case 135 during a cutting operation. A guard 174 may be utilized to cover the windows 172 to contain shavings from the trimming operation performed in the cartridge case trimmer 100. The guard 174 may be secured to the housing 105 by friction and removable from the housing 105 by sliding the guard 174 along the longitudinal axis A. Elastomeric o-rings 176, disposed in circumferential grooves 178 formed in the housing 105, may be utilized to frictionally couple the guard 174 to the housing 105. The guard 174 may be a transparent polymer material, such as a Lexan® polymer material, or other suitable material. The windows 172 may be utilized to monitor build-up of shavings produced by the trimming operation of the cartridge case trimmer 100 and prompt a user to remove the guard 174 to dispose of the shavings, when necessary. Many conventional trimmers do not include a guard disposed about the cutting tool, which allows shavings to fly or fall out of the device during cutting. However, the use of the guard 174 enables containment of debris from the cutting operation when using the cartridge case trimmer 100. The containment of debris enhances neatness of the workplace as well as reduces safety risks that may be present when shavings are allowed to freely exit the housing. Further, the guard 174 may be removed easily and replaced, if necessary, such as when the guard becomes less transparent due to scratches.

Figure 4:
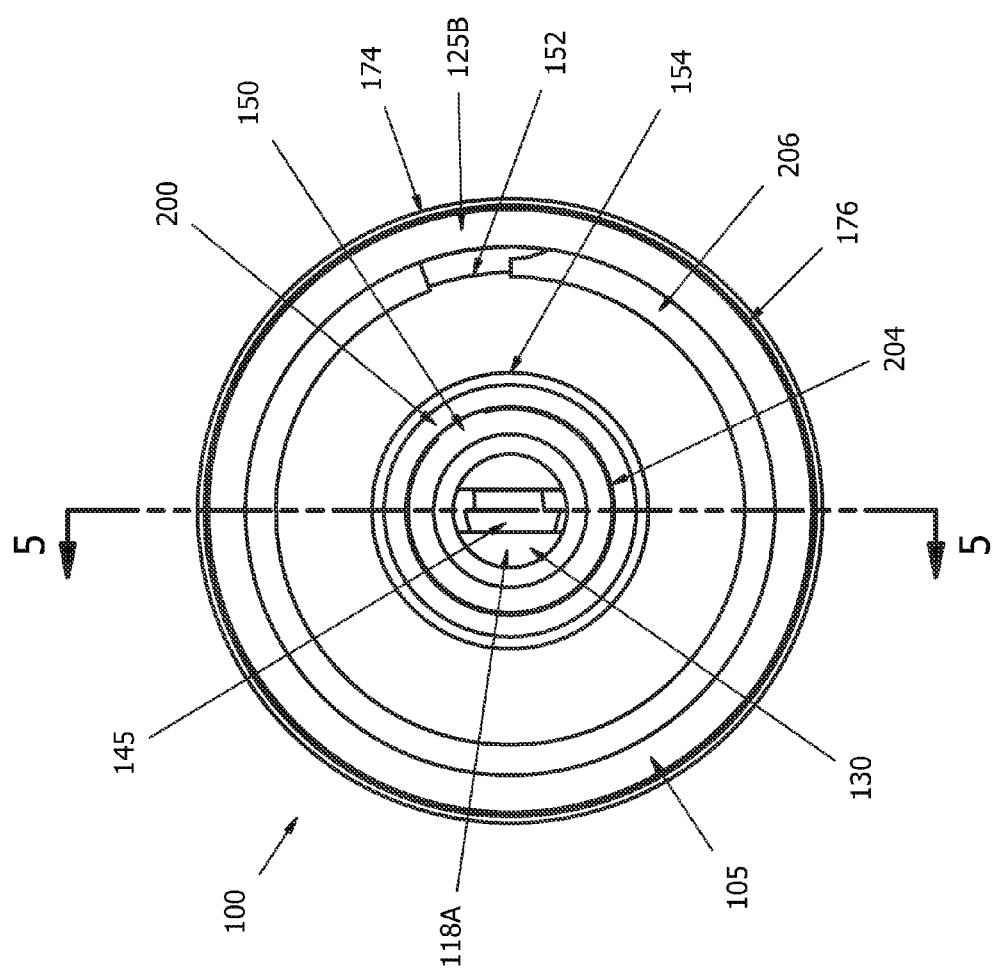
FIG. 4 is a front view of a cartridge case trimmer.
Figure 5:
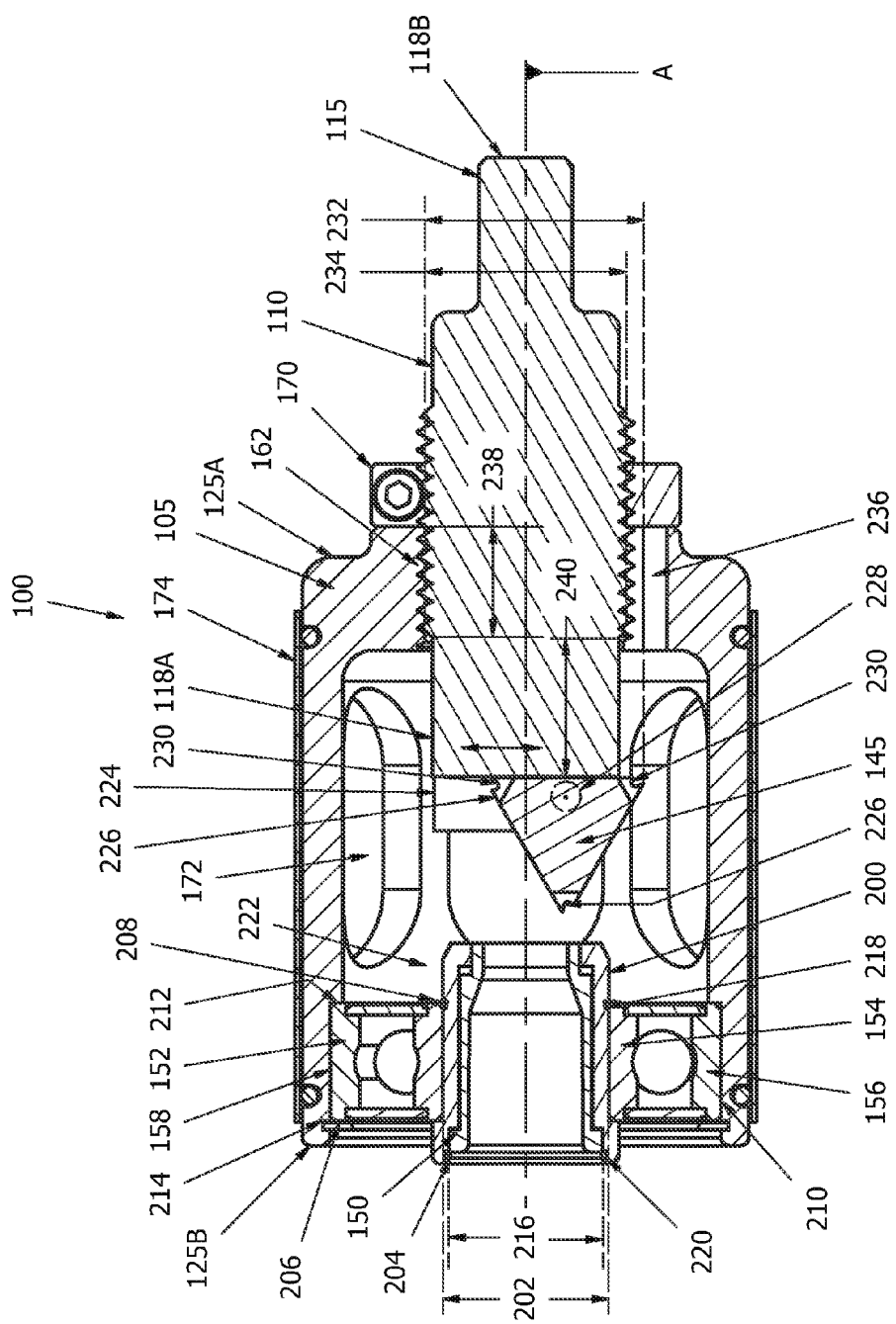
FIG. 5 is a cross-sectional view of the cartridge case trimmer along lines 5-5 of FIG. 4.

FIG. 4 is a front view of the cartridge case trimmer 100 and FIG. 5 is a cross-sectional view of the cartridge case trimmer 100 along lines 5-5 of FIG. 4. In FIG. 4, the second side 125B of the housing 105 is shown and the cutting tool 145 is visible through the opening 130 formed in the second side 125B cutting tool 145. Portions of the insert 150 are also shown in the opening 130. In some embodiments, the insert 150 may disposed in a bushing 200 that is sized to be received in an inside diameter 202 of the bearing 152. A retainer 204 may be utilized to couple the insert 150 to the bushing 200. Similarly, a retainer 206 is utilized to couple the bearing 152 to the housing 105. Each of the retainers 204, 206 may be a split ring retainer that may be easily installed or removed. When the bushing 200 is utilized, a retainer 208 (shown in FIG. 5) may be used to couple the bushing 200 to the bearing 152.

As shown in FIG. 5, the bearing 152 is disposed in the bearing receiving region 158 of the housing 105. The bearing receiving region 158 may include an inside diameter defined between an inner surface 210 of the bearing receiving region 158. An inwardly extending shoulder 212 may be formed in the housing 105 to define the bearing receiving region 158. The bearing 152 may be inserted into the housing 105 and when the retainer 206 is provided into a groove 214 formed in the housing 105, the bearing 152 is longitudinally fixed between the retainer 206 and the shoulder 212. The bushing 200 may then be inserted into the inside diameter 202 of the inner ring 154 of the bearing 152, and the retainer 208 is provided in a groove 218 formed in the outside diameter of the bushing 200 to longitudinally fix the bushing 200 against the inner ring 154 of the bearing 152. The insert 150 may then be provided in an inside diameter 216 of the bushing 200, and the retainer 204, disposed in a groove 220 formed in the inside diameter 216, longitudinally fixes the insert 150 against the bushing 200. In some embodiments, the insert 150 and the bushing 200 form a case indexing assembly 222 described in FIG. 7.

The mandrel 110 is shown at least partially inserted into the housing 105 in FIG. 5. The cutting tool 145 is disposed in an indexing slot 224 formed in the first end 118A. The cutting tool 145 includes a plurality of cutting surfaces 226. In some embodiments, each of the cutting surfaces 226 include a notch 230 which facilitates length reduction of the cartridge case 135 (shown in FIGS. 1-3) as well as deburring and/or chamfering of one or both of the inside and outside diameters of the mouth 140 of the cartridge case 135 (shown in FIGS. 1-3). The indexing slot 224 provides axial adjustment of the cutting tool 145 (in the direction of the arrow) such that one of the cutting edges 226 of the cutting tool 145 may be properly aligned with the mouth 140 of the cartridge case 135 (shown in FIGS. 1-3). A set screw 228 (shown in phantom) may be used to lock the cutting tool 145 within the indexing slot 224 after adjustment. Access to the set screw 228 during adjustment of the cutting tool 145 may be made through the windows 172 (when the guard 174 is removed).

In some embodiments, the desired position of the cutting tool 145 on the mandrel 110 provides that a portion of the cutting tool 145 extends radially outward from the body of the mandrel 110. The radial extension of the cutting tool 145 may include a dimension 232 that is greater than a dimension 234 (which may be an inside diameter of the first side 125A of the housing 105). Thus, installation or removal of the mandrel 110 from the housing 105 may require readjustment of the cutting tool 145 each time the cartridge case trimmer 100 is assembled or disassembled. However, in some embodiments, the first side 125A of the housing 105 includes a channel 236 formed along the longitudinal axis A. The channel 236 may be a relief in the threads 162 formed in the opening in the housing 105, thus allowing the mandrel to be inserted or removed therefrom with the cutting tool 145 in a fixed position. For example, the mandrel 110 and the housing 105 may be rotated against each other to free the mandrel 110 from a threaded region 238 of the housing 105. A cylindrical region 240 (i.e., a non-threaded surface) of the mandrel 110 has a longer length than a length of the threaded region 238 of the housing 105. Thus, in a disassembly procedure, after the threaded regions of the mandrel and the housing 105 disengage, the mandrel 110 is free so that the mandrel 110 may be manipulated to align the cutting tool 145 with the channel 236.

Figure 6:
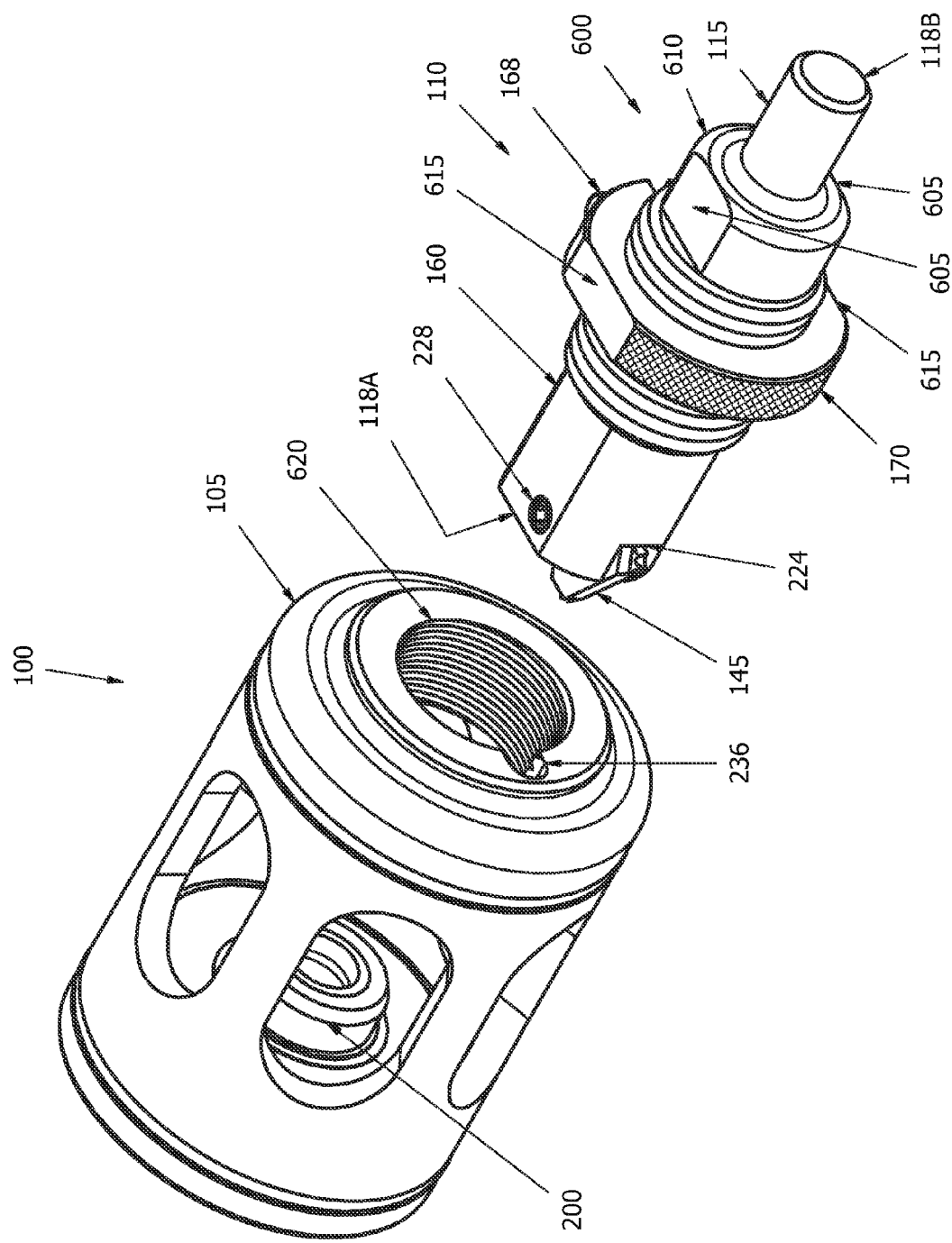
FIG. 6 is an isometric view of the cartridge case trimmer 100 with the mandrel removed.

FIG. 6 is an isometric view of the cartridge case trimmer 100 with the mandrel 110 removed from the housing 105. As shown, the cutting tool 145 is substantially aligned with the groove 236. Also shown is a tool interface 600 provided on the second end 118B of the mandrel 110. The tool interface 600 may include opposed flats 605 formed in a body 610 of the mandrel 110. Likewise, the locking split ring 170 may include a tool interface, such as opposed flats 615. The flats 605, 615 are adapted to interface with a tool, such as a wrench, that may be used when adjusting the extension of the mandrel 110 in the housing 105, as well as tightening the locking split ring 170 against a face 620 of the housing 105 in order to lock the mandrel 110 in place.

Figure 7:
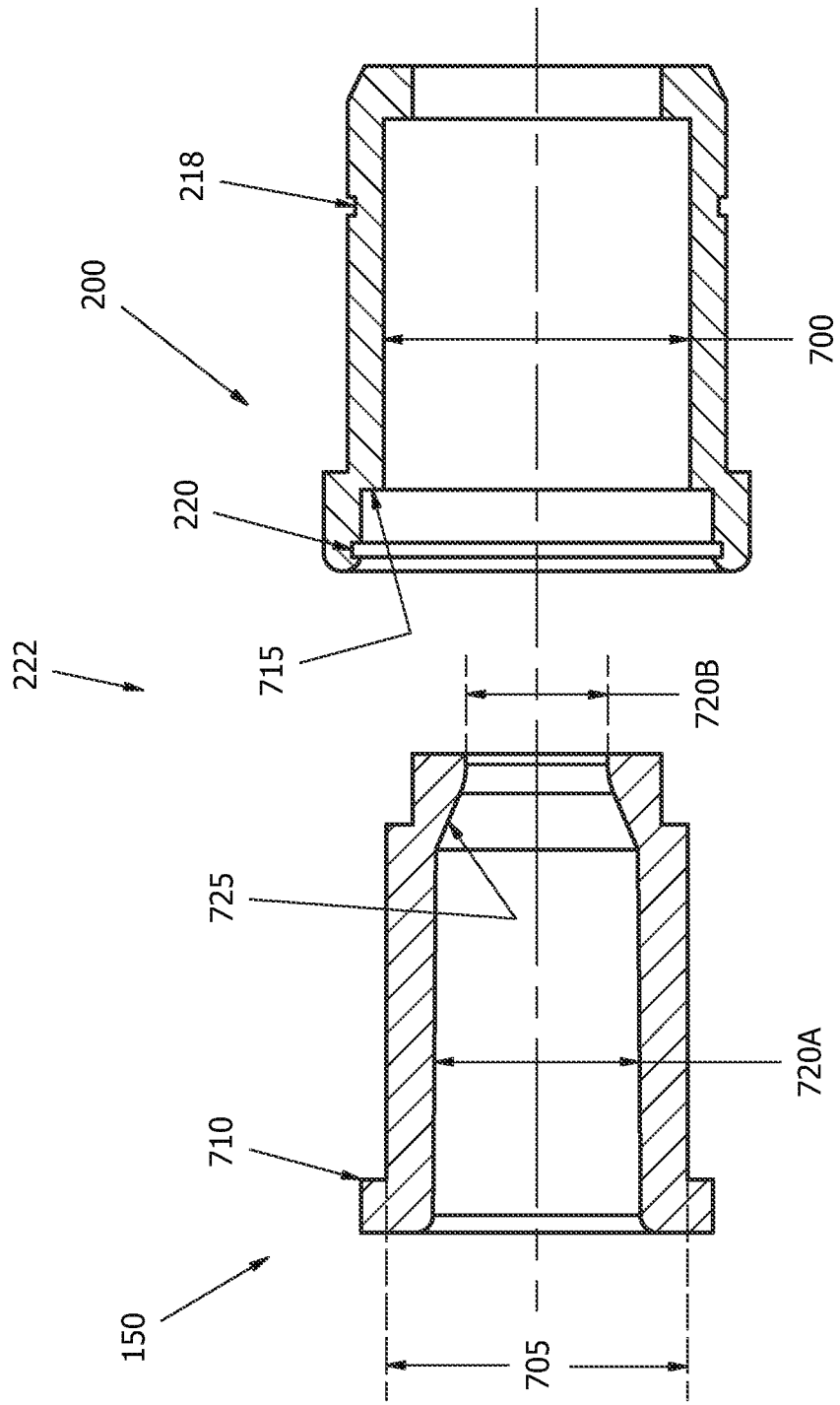
FIG. 7 is an exploded cross-sectional view of a case indexing assembly.

FIG. 7 is an exploded cross-sectional view of the case indexing assembly 222. The case indexing assembly 222 includes the insert 150 as well as the bushing 200. The bushing 200 includes an inside diameter 700 that is adapted to receive an outer diameter 705 of the insert 150. The insert 150 may also include a shoulder 710 that contacts a recess 715 of the bushing 200 when the bushing 200 and the insert 150 are coupled together. The insert 150 also includes inside diameters 720A and 720B sized to receive a head diameter and a neck diameter, respectively, of a specific cartridge case 135 (shown in FIGS. 1-3). A tapered region 725 is disposed between the inside diameters 720A, 720B. The tapered region 725 substantially matches the length and/or the angle of the shoulder of the specific cartridge case 135.

Figure 8:
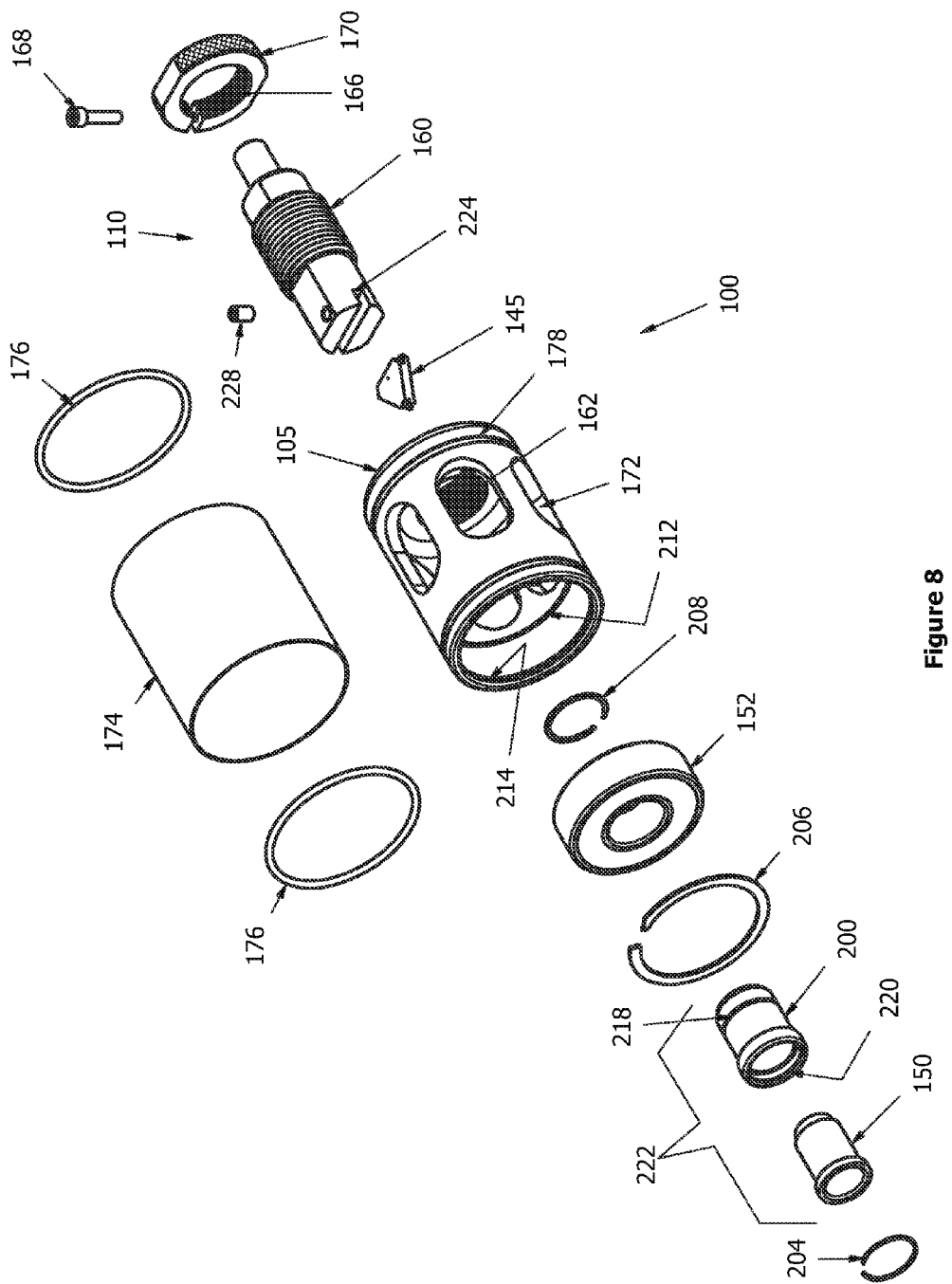
FIG. 8 is an exploded isometric view of a cartridge case trimmer showing constituent elements thereof.

FIG. 8 is an exploded isometric view of the cartridge case trimmer 100 showing constituent elements thereof.

While the foregoing is directed to embodiments of the disclosure, other and further embodiments of the invention may be devised without departing from the basic scope thereof.

What is claimed is:

1. A cartridge case trimmer, comprising:
a cylindrical housing having a longitudinally-oriented opening formed in a first side of the housing;
a detachable transparent cover disposed on the cylindrical housing;
a mandrel detachably coupled to the longitudinally-oriented opening formed in a first side of the cylindrical housing, the mandrel having a first end including a cutting tool disposed in a slot on the first end and comprising one or more notched cutting surfaces, the mandrel having a second end opposing the first end, the second end protruding from the first side of the cylindrical housing and sized to be received in a chuck;
a bearing disposed within the cylindrical housing adjacent to a second side of the cylindrical housing; and
a removable and replaceable insert comprising a tapered region disposed in an inside diameter of an inner ring of the bearing to receive a cartridge case, wherein the longitudinally oriented opening includes a threaded region having a length that is less than a length of the mandrel, and wherein the mandrel includes threads that interface with the threaded region.

2. The trimmer of claim 1, wherein the insert is disposed in a bushing.

3. The trimmer of claim 1, further comprising a fastener that interfaces with the threads on the mandrel.

4. The trimmer of claim 3, wherein the fastener comprises a locking split ring.

5. The trimmer of claim 1, wherein the cutting tool is configured to reduce a length of the cartridge case, chamfer the cartridge case, and deburr the cartridge case in one operation.

6. A cartridge case trimmer, comprising:
a cylindrical housing having a longitudinally-oriented opening formed in a first side of the housing;
a mandrel having a first end and a second end opposing the first end, the first end of the mandrel being detachably coupled to the longitudinally-oriented opening formed in a first side of the cylindrical housing and including a cutting tool that has a cutting edge that extends beyond a diameter of the mandrel, the second end of the mandrel protruding from the first side of the cylindrical housing and sized to be received in a chuck;
a locking fastener that couples the mandrel to the cylindrical housing;
a bearing disposed within the cylindrical housing adjacent to a second side of the cylindrical housing; and
an insert disposed in an inside diameter of an inner ring of the bearing, the insert being replaceable based on a desired cartridge case caliber to be trimmed, wherein the longitudinally-oriented opening includes a threaded region and a channel is formed across a portion of the threaded region, and wherein a width of the channel is slightly greater than a width of the cutting tool.

7. The trimmer of claim 6, wherein the threaded region includes a length that is less than a length of a cylindrical region of the mandrel.

8. The trimmer of claim 6, wherein the mandrel includes threads that interface with the threaded region.

9. The trimmer of claim 8, wherein the locking fastener interfaces with the threads on the mandrel.

10. The trimmer of claim 6, wherein the housing includes one or more windows formed therein.

11. A cartridge case trimmer, comprising:
a cylindrical housing having a first side and a second side opposing the first side and a longitudinally-oriented opening having a threaded region formed in the first side of the housing;
a mandrel detachably coupled to the longitudinally-oriented opening comprising a threaded region formed in the first side of the cylindrical housing, the mandrel having a first end including a cutting tool disposed in an indexing slot on the first end and comprising one or more notched cutting surfaces, the mandrel having a second end opposing the first end, the second end protruding from the first side of the cylindrical housing and sized to be received in a chuck and having a channel across a portion of the threaded region of the opening;
a bearing disposed within the cylindrical housing adjacent to a second side of the cylindrical housing; and
an insert disposed in an inside diameter of an inner ring of the bearing to receive a cartridge case, wherein the cutting tool is configured to reduce a length of the cartridge case, chamfer the cartridge case, and deburr the cartridge case in one operation.

12. The trimmer of claim 11, wherein a width of the channel is slightly greater than a width of the cutting tool.

13. The trimmer of claim 11, wherein the threaded region includes a length that is less than a length of a cylindrical region of the mandrel.

14. The trimmer of claim 11, wherein the housing includes one or more windows formed therein.

15. The trimmer of claim 11, further comprising a detachable cover disposed on the cylindrical housing.

* * * * *